United States Patent [19]

Mustonen et al.

[11] Patent Number: 5,266,643
[45] Date of Patent: Nov. 30, 1993

[54] PROCESS FOR THE MODIFICATION OF OLEFIN POLYMERS TO FORM A COUPLING AGENT

[75] Inventors: Tarja Mustonen, Helsinki; Tuula Telén, Porvoo; Bo Malm, Espoo, all of Finland

[73] Assignee: Neste Oy, Espoo, Finland

[21] Appl. No.: 709,643

[22] Filed: Jun. 3, 1991

[30] Foreign Application Priority Data

Jun. 15, 1990 [FI] Finland .................................. 903035

[51] Int. Cl.$^5$ .................................................. C08F 8/46
[52] U.S. Cl. ............................... 525/263; 525/264; 525/265; 525/285; 525/301; 525/304
[58] Field of Search ............... 525/263, 264, 265, 285, 525/301, 304

[56] References Cited

U.S. PATENT DOCUMENTS 4,578,428  3/1986  Clementini et al. .
4,585,833  4/1986  Domeier ............................. 525/265
4,663,357  5/1987  Meyer et al. ........................ 525/263

FOREIGN PATENT DOCUMENTS 0109532  5/1984  European Pat. Off. .

*Primary Examiner*—Bernard Lipman
*Attorney, Agent, or Firm*—Tilton, Fallon, Lungmus & Chestnut

[57] ABSTRACT

The invention relates to a process for the modification of an olefin polymer to form a coupling agent by grafting it with an unsaturated acid or acid derivative in the presence of a free-radical initiator. The process comprises stages at which a) the olefin polymer, the unsaturated acid or acid derivative and a first free-radical initiator are heated together to a temperature at which the first free-radical initiator substantially breaks down into free radicals, and b) the reaction mixture derived from stage a) is heated together with a second free-radical initiator to a temperature at which the second free-radical initiator substantially breaks down into free radicals. By the process, olefin polymers can be modified effectively without their macromolecules degrading excessively.

18 Claims, No Drawings

PROCESS FOR THE MODIFICATION OF OLEFIN POLYMERS TO FORM A COUPLING AGENT

The invention relates to a process for the modification of an olefin polymer to form a coupling agent by grafting it with an unsaturated acid or acid derivative in the presence of a free-radical initiator. The invention also relates to the use of a modified olefin polymer, prepared by such process, as a coupling agent between itself and glass or metal. It can also be used as a so-called compatibilizer in polymer/polymer mixtures.

Such a coupling agent is usually prepared by grafting to olefin polymers unsaturated small-molecule compounds, for example carboxylic acids, their anhydrides, or esters such as (met)acrylic acid derivatives 1) in a solution
2) in an extruder at an elevated temperature (cf. U.S. Pat. Nos. 3,953,655 and 4,001,172), or
3) at a temperature below the boiling point of the olefin polymer by the so-called fluid bed method (U.S. Pat. No. 3,414,551). Organic radical initiators such as peroxides are used as an aid in the grafting reaction.

From EP application 109532 there is known a two-stage process wherein an olefin polymer is first pretreated with an organic peroxide which breaks down at an elevated temperature into radicals (half-life at 100° C. less than 30 minutes), whereafter the pretreated polymer is mixed and grafted at room temperature with an unsaturated carboxylic acid and is extruded at a temperature higher than the former in the presence of an organic peroxide which breaks down into radicals at a higher temperature (half-life at 200° C. less than or equal to 30 seconds).

U.S. Pat. No. 4,550,130 describes the modification of an olefin polymer by reacting it with an unsaturated carboxylic acid in the presence of at least one peroxide catalyst. According to one embodiment, the catalyst is composed of benzoyl peroxide (10-hour half-life at 73° C.) and of a peroxide which decomposes more slowly (10-hour half-life at a temperature of at least 80° C.) than benzoyl peroxide. What is in question is a single-stage modification in the presence of radical initiators which break down at different rates.

When olefin polymers are modified with an unsaturated carboxylic acid in the presence of a radical initiator, there always occurs, in addition to the linking of the acid, also degradation of the polymer molecule through the radical mechanism. This is manifested as an immoderate increase of the melt index or the melt flow rate.

The object of the invention is a maximally efficient modification, measured as the proportion of the acid linked to the olefin polymer. Another object is a minimal breaking down of the olefin polymer molecules, measured as an increase of the melt index or the melt flow rate. These objects should be achieved with as low a consumption as possible of the modifying agent and the catalyst.

The above disadvantages are avoided and the objects are achieved using a new process for the modification of an olefin polymer, the process being mainly characterized in what is stated in the characterizing clause of Claim 1. In the improved process which is the object of the invention, the grafting of the olefin polymer with an unsaturated acid or acid derivative is carried out in two stages with the help of a radical reaction by using two different free-radical initiators. At the first stage, the olefin polymer, the unsaturated acid or acid derivative, and the first free-radical initiator are heated together to a temperature at which the said first free-radical initiator substantially breaks down into free radicals. At the second stage the reaction mixture obtained from the first reaction stage is heated together with the second free-radical initiator to a temperature at which the second free-radical initiator substantially breaks down into free radicals.

According to one preferred embodiment, the first stage of the modification is carried so that the first free-radical initiator is degraded at a temperature clearly lower than is the said second free-radical initiator. From this it follows, of course, that the first free-radical initiator will break down into radicals at a temperature clearly lower than will the said second free-radical initiator. The half-life of the first free-radical initiator is in this case preferably less than 1 minute at 130° C., and the half-life of the second free-radical initiator is preferably more than 1 minute at 130° C.

If the temperature used at the first stage is substantially lower than the temperature used at the second stage, the second free-radical initiator may be present at both the first stage and the second stage. It has indeed been observed surprisingly that the content of acid or acid derivative in the olefin polymer rises to a considerably higher level when the second free-radical initiator is present also at the first stage, as compared with the situation in which the second free-radical initiator is not added until the second stage. This may be due to an induced degradation reaction between the initiators.

An olefin polymer capable of being modified may be any homopolymer or copolymer of an olefin or any mixture of the same. The most preferred olefin polymer is a homopolymer or copolymer of propylene, or a mixture of these and another olefin polymer such as polybutylene.

The modification of an olefin polymer to form an adhesive material such as a coupling agent is carried out by grafting it with an unsaturated acid or acid derivative. Examples of preferred unsaturated acids are carboxylic acids: itaconic acid, fumaric acid, maleic acid(anhydride), acrylic acid, or any mixture of these. We have also observed surprisingly that fumaric acid links to an exceptionally high degree to olefin polymers. According to one embodiment, the unsaturated acid derivative may also be an ester such as hydroxyethylmetacrylate. The amount of grafting acid or acid derivative is 1–10% by weight, preferably 1–5% by weight, of the total amount of the polymer.

The modification reaction takes place in the presence of a free-radical initiator. The free-radical initiator may be a peroxide. Examples of organic peroxides include diacyl peroxides, dialkyl peroxides, peroxy acids, peroxy esters, hydroperoxides (usually as a redox pair), and alpha-oxy and alphaperoxy hydroperoxides and peroxides. Examples of other free-radical initiators are azo-compounds, N-nitrosoanilides, and combinations of dialkyl peroxides with silanes. Peroxides are the most practical free-radical initiators. At the first stage it is advantageous to use a peroxide which has a ten-hour half-life temperature below 100° C., and/or the half-life of which is less than 1 minute at 130° C. Typical such free-radical initiators are dilauroyl peroxide and dibenzoyl peroxide. The free-radical initiator used at the second stage is preferably an organic peroxide the ten-hour half-life temperature of which is above 100° C. and/or the half-life of which is more than 1 minute at 130° C. Some preferred peroxides of this type are 1,3-bis(t-butylperoxy-isopropyl)benzene, 1,4-bis(2-t-butyl-peroxy-isopropyl)benzene, and 2,5-dimethyl-2,5-bis(t-butylperoxy)hexene. The free-radical initiator or initiators is/are preferably used at 0.05-0.5% by weight, preferably at 0.05-0.1% by weight, of the total amount of the polymer.

According to one embodiment, the first stage is an external mixing stage carried out at a temperature clearly below the melting point of the olefin polymer, at which stage the polymer is in a solid state. Such external mixing can be carried out by using a Henschel mixer, or preferably a Papenmeier mixer. The rotation velocity is preferably 0–2,000 rpm.

The second stage is preferably an internal mixing stage carried out at a temperature above or close to the melting point of the polymer, at which stage the olefin polymer is in a substantially molten state. In this case the internal mixing is carried out using, for example, a Banbury mixer, a Werner Pfleiderer mixer or, preferably, a double-screw extruder. When a double-screw extruder is used, the temperature profile used is preferably one which rises from approximately 160° C. to 250° C.

The invention is typically implemented in such a manner that at the first stage a pulverous propylene polymer, an unsaturated carboxylic acid and the first peroxide, i.e. peroxide 1, having a low degradation half-life (less than 1 minute at 130° C.), or alternatively peroxide 1 or 2, are mixed with each other in a rapidly rotating mixer at an elevated temperature (approx. 70°-140° C.), which is, however, below the melting point of the propylene polymer. The half-life of the second peroxide, i.e. peroxide 2, is more than one minute at 130° C. The second stage takes place in a molten state (approx. 190°-230° C.) in a double-screw extruder. At this stage, peroxide 2 is added before the working of the melt or during it, if it has not been added already at the first stage.

The advantage of the invention over the prior-known grafting processes is that the propylene polymer and the reacting unsaturated compound are allowed to react together first with peroxide 1 at an elevated temperature, approx. 70°-140° C., at which time the unsaturated compound is coupled with the polymer and the polymer breaks down only slightly and its melt index remains moderate. At the first stage the reaction period at the maximum temperature is approx. 5-15 minutes. At the second stage, i.e. the melt working stage, the final grafting takes place with the aid of peroxide 2 in an extruder in which the temperature is approx. 190°-230° C. and the retention time is approx. 1-3 minutes. In this manner a maximal proportion of the unsaturated compound can be caused to bond chemically to the polymer.

If the grafting is carried out in a single stage in an extruder under the same conditions as stage 2, most of the reacting unsaturated compound will evaporate (sublimate). In addition, the reaction will be left incomplete, from which it follows that most of this unsaturated compound will remain free, a circumstance which has a detrimental effect on the coupling agent. At the same time the chains of the polymer break down and the melt index rises drastically.

EXAMPLE 1

A polypropylene powder having a melt index of 6.5 g/10 min (ASTM D1238, method L) and itaconic acid at 3% (calculated from the PP powder) were mixed by means of a Papenmeier mixer at 1,600 rpm. When the temperature had risen to 70° C., dilauroyl peroxide (peroxide 1) at 0.05% and 1,3-bis(t-butylperoxyisopropyl)benzene (peroxide 2) at 0.05% were added with the help of isopropanol, the mixing velocity being 800 rpm. The temperature of the mixture was raised to 100° C. and the mixing velocity to 1,800 rpm. Then the mixture was cooled to 38° C. The obtained mixture was mixed by means of a double-screw extruder the temperature profile of which was 160°-210° C.

The grafted polypropylene contained acid in total 1.29%, the proportion of free acid was 0.19%, and the melt index of the product was 14.1 g/10 min.

EXAMPLE 2

The procedure was as in Example 1, but peroxide 2 was mixed with the polypropylene only after the Papenmeier mixing. The mixture was mixed as in Example 1.

The total acid content of the grafted polypropylene was 0.94%, the free acid content was 0.11%, and the melt index of the product was 12.7 g/10 min.

EXAMPLE 3

The procedure was as in Example 1, but the amount of itaconic acid was 1%. The total acid content in the grafted polypropylene was 0.37%, the free acid content was 0.04% and the melt index of the product was 15.0 g/10 min.

EXAMPLE 4

The procedure was as in Example 1, but both peroxide 1 and peroxide 2 were used at 0.025%.

The total acid content in the grafted polypropylene was 0.39%, the free acid content was 0.08%, and the melt index of the product was 9.1 g/10 min.

EXAMPLE 5

The same experiments as in Examples 1 and 3 were performed using fumaric acid.

The grafted product had the following properties:

| Fumaric acid content in reaction product/% | Grafted product | | |
| --- | --- | --- | --- |
| | Total acid content/% | Free acid content/% | Melt index g/10 min |
| a) 1 | 0.66 | 0.35 | 19.1 |
| b) 3 | 2.4 | 0.79 | 42.2 |

EXAMPLE 6

Polypropylene was grafted with maleic acid anhydride at 3% by using as peroxide 1 in the Papenmeier mixer benzoyl peroxide at 0.05% and the above-mentioned peroxide 2 at 0.05%, of which one-half was added in the Papenmeier mixer and one-half in the double-screw extruder.

The total acid content of the grafted product was 1.1%, the free acid content was 0.26%, and the melt index of the product was 14.2 g/10 min.

EXAMPLE 7

Grafting was carried out as in Example 6, but maleic acid anhydride was used at 5%, and all of the peroxide 2 was added in the Papenmeier mixer.

The total acid content of the grafted product was 3.7%, the free acid content was 0.24%, and the melt index of the product was 7.8 g/10 min.

EXAMPLE 8

Mixtures of unsaturated compounds were grafted to polypropylene so that in the reaction mixture the total content of unsaturated compounds was 3% and the total content of the above-mentioned peroxides 1 and 2 was 0.1%. The peroxides were added in the Papenmeier mixer, as in Example 1.

The following results were obtained in the grafting:

| Mixture of unsaturated acids | Grafted product | | |
|---|---|---|---|
| | Total acid content/% | Free acid content/% | Melt index g/10 min |
| a) Itaconic acid + maleic acid anhydride | 0.38 | 0.08 | 6.6 |
| b) Itaconic acid + maleic acid anhydride | 0.48 | 0.06 | 10.8 |
| c) Fumaric acid + maleic acid anhydride | 0.96 | 0.48 | 9.3 |

EXAMPLE 9

A 1:1 mixture of polypropylene (melt index 6.5 g/10 min) and polybutylene (melt index 0.4 g/10 min) was grafted with an unsaturated acid, which was used at 3%. Peroxides were used at 0.1%, and these were added in the Papenmeier mixer. The grafting was carried out as in Example 8.

The following results were obtained:

| Unsaturated acid | Grafted product | | |
|---|---|---|---|
| | Total acid content/% | Free acid content/% | Melt index g/10 min |
| a) Itaconic acid | 0.56 | 0.1 | 6.9 |
| c) Fumaric acid | 2.49 | 1.8 | 25 |

EXAMPLE 10

A copolymer of propylene and ethylene (ethylene at 3%, melt index 2 g/10 min) was grafted with itaconic acid at 3%, as described in Example 8. A grafted product was obtained which had a total acid content of 0.63%, a free acid content of 0.05%, and the melt index of the product was 6.7 g/10 min.

EXAMPLE 11

Maleic acid anhydride at 5%, itaconic acid at 7.5% or fumaric acid at 6% was grafted to polypropylene (melt index 6.5 g/10 min) by direct extrusion (double-screw extruder). The above-mentioned peroxide 2 was used, which was added one-half together with the polypropylene, and the other half was pumped into the molten polypropylene.

| Unsaturated acid | Grafted product | | |
|---|---|---|---|
| | Total acid content/% | Free acid content/% | Melt index g/10 min |
| a) Maleic acid anhydride | 0.43 | 0.21 | 8.2 |
| b) Itaconic acid | 0.7 | 0.28 | 12.1 |
| c) Fumaric acid | 4.3 | 2.7 | 198 |

EXAMPLE 12

Polypropylene (melt index 6.5) was grafted with acrylic acid at 2% or with itaconic acid at 2% and by using dilauroyl peroxide at 0.05% as the first peroxide, which was added in the Papenmeier mixer. The reaction temperature was 130° C. and the reaction period was 10-15 min. The second peroxide used was 2,5 dimethyl-2,5-bis(t-butylperoxy)hexene, which was added at 0.05% at the end of the Papenmeier mixing.

The mixture was mixed in a double-screw extruder at 200° C.

| Unsaturated acid | Grafted product | | |
|---|---|---|---|
| | Total acid content/% | Free acid content/% | Melt index g/10 min |
| a) Acrylic acid | 1.63 | 0.03 | 41 |
| b) Itaconic acid | 0.73 | 0.20 | 36 |

EXAMPLE 13

A copolymer of propylene and ethylene (ethylene content 8% and melt index 1.0 g/10 min) was grafted with hydroxyethylmetacrylate (HEMA) at 3%, as in Example 12.

The grafted product contained HEMA at 1.5%, and its melt index was 14.6 g/10 min.

EXAMPLE 14

This reference example was carried out according to EP 109532. The polypropylene and both peroxides, lauroyl peroxide (0.3%) and 2,5-dimethyl-2,5-bis(t-butylperoxy)hexene (0.05%), were added into the Papenmeier mixer. At the beginning of the reaction the temperature was raised to 110° C. and mixing was carried out for 1 hour. Thereafter the mixture was cooled to 30° C., and the unsaturated acid (2%) was added. Thereafter the mixture was further mixed in the Papenmeier mixer for 20 minutes. The mixture was mixed as in Example 12.

| Unsaturated acid | Grafted product | | |
|---|---|---|---|
| | Total acid content/% | Free acid content/% | Melt index g/10 min |
| a) Acrylic acid | 1.35 | 0.02 | 216 |
| b) Itaconic acid | 0.93 | 0.28 | 54 |

A comparison of these two methods according to Examples 12 and 14 shows that in the process according to the present application the reaction is approximately twice as rapid to carry out, and the melt index of the product is not as high as in the process according to EP 109532.

A comparison between direct extrusion graftings and two-stage graftings shows that the proportion of free acid and also the proportion of evaporating (sublimating) acid is higher in direct single-stage grafting (see Table 2).

EXAMPLE 15

The functioning of the coupling agents prepared was tested with glass mixtures having a glass content of 30%. The mixtures were prepared by mixing in a double-screw extruder. The polypropylene/coupling agent mixture was fed in from scales, and the glass was added by a separate glass feed.

The mechanical properties of the test pieces injection molded from the mixtures prepared were compared with the mechanical properties of mixtures containing commercial coupling agents and those of pure glass-/polypropylene mixtures.

The comparison, which is shown in Table 3, shows that the coupling agents according to the present patent application improve the mechanical properties equally well as do the commercial products.

EXAMPLE 16

The functioning of the grafted products as adhesion plastics was tested on aluminum. A grafted polypropylene product was compressed between two Al sheets (thickness 0.08 mm) at 200° C. in a Fontijne press in 4–5 minutes. Test pieces (width 2 cm) were cut out of the sheet, and the adhesion was measured by a so-called peeling test using an Instron apparatus, the pulling rate being 50 mm/min. The following results were obtained with the products prepared by the processes according to a number of the examples.

| Grafted product | Adhesive strength N/cm |
|---|---|
| Example 12a | 7.3 |
| Example 12b | 1.9 |
| Example 14a | 5.8 |
| Example 14b | 2.3 |

The results are compiled in Table 1.

TABLE 1

Results of grafting

| | | | Acid | | Peroxide 1 | | Peroxide 2 | | | Grafted product | |
|---|---|---|---|---|---|---|---|---|---|---|---|
| Ex. | Olef. polymer | Melt index MI/g/10 min | Comp. | Amount w-% | Comp. | Amount w-% | Comp. | Amount w-% | Addition stage | Acid content % | Melt index g/10 m |
| 1 | PP | 6.5 | Itaconic | 3 | DLP | 0.05 | BBIB | 0.05 | a | 1.29 | 14.1 |
| 2 | PP | 6.5 | Itaconic | 3 | DLP | 0.05 | BBIB | 0.05 | b | 0.94 | 12.1 |
| 3 | PP | 6.5 | Itaconic | 1 | DLP | 0.05 | BBIB | 0.05 | a | 0.37 | 15.0 |
| 4 | PP | 6.5 | Itaconic | 3 | DLP | 0.025 | BBIB | 0.05 | a | 0.39 | 9.1 |
| 5a | PP | 6.5 | Fumaric | 1 | DLP | 0.05 | BBIB | 0.05 | a | 0.66 | 19.1 |
| 5b | PP | 6.5 | Fumaric | 3 | DLP | 0.05 | BBIB | 0.05 | a | 2.40 | 42.2 |
| 6 | PP | 6.5 | Maleic | 3 | BP | 0.05 | BBIB | 0.05 | 0.5 a 0.5 b | 1.10 | 14.2 |
| 7 | PP | 6.5 | Maleic | 5 | BP | 0.05 | BBIB | 0.05 | a | 3.70 | 7.8 |
| 8a | PP | 6.5 | I + MA | 3 | DLP | 0.05 | BBIB | 0.05 | a | 0.38 | 6.6 |
| 8b | PP | 6.5 | I + MA | 3 | DLP | 0.05 | BBIB | 0.05 | a | 0.48 | 10.8 |
| 8c | PP | 6.5 | F + MA | 3 | DLP | 0.05 | BBIB | 0.05 | a | 0.96 | 9.3 |
| 9a | PP + PB (1:1) | 6.5 + 0.4 | I | 3 | DLP | 0.05 | BBIB | 0.05 | a | 0.56 | 6.9 |
| 9b | PP + PB (1:1) | 6.5 + 0.4 | F | 3 | DLP | 0.05 | BBIB | 0.05 | a | 2.49 | 25.0 |
| 10 | PP/Ecopol. | 2.0 | I | 3 | DLP | 0.05 | BBIB | 0.05 | a | 0.63 | 6.7 |
| 11a | PP | 6.5 | MA | 5 | — | — | BBIB | 0.1 | 0.5 b 0.5½ v.b. | 0.43 | 8.2 |
| 11b | PP | 6.5 | I | 7.5 | — | — | BBIB | 0.1 | 0.5 b 0.5½ v.b. | 0.70 | 12.1 |
| 11c | PP | 6.5 | F | 6 | — | — | BBIB | 0.1 | 0.5 b 0.5½ v.b. | 4.30 | 198 |
| 12a | PP | 6.5 | Acrylic | 2 | DLP | 0.05 | DMBBH | 0.05 | end of a | 1.63 | 41 |
| 12b | PP | 6.5 | I | 2 | DLP | 0.05 | DMBBH | 0.05 | end of a | 0.73 | 36 |
| 13 | PP/Ecopol. | 1.0 | HEMA | 3 | DLP | 0.05 | DMBBH | 0.05 | end of a | 1.50 | 14.6 |
| 14a | PP | 6.5 | A 2 | 2 | DLP | 0.3 | DMBBH | 0.05 | a | 1.35 | 216 |
| 14b | PP | 6.5 | I 2 | 2 | DLP | 0.3 | DMBBH | 0.05 | a | 0.93 | 54 |

TABLE 2

Comparison of two-stage extrusion grafting with single-stage grafting

| Unsaturated acid | Amount % | Number of stages | Total acid/% | Free acid cont./% | Free/ total | Melt index g/10 min | Example No. |
|---|---|---|---|---|---|---|---|
| maleic acid anhydride | 5 | 2 | 3.75 | 0.24 | 6.6 | 7.8 | 7 |
| | 5 | 1 | 0.43 | 0.21 | 49 | 8.2 | 11a |
| fumaric acid | 3 | 2 | 2.4 | 0.79 | 33 | 42 | 5b |
| | 6 | 1 | 4.3 | 2.7 | 63 | 198 | 11c |
| itaconic acid | 3 | 2 | 0.94 | 0.11 | 11.8 | 12.7 | 2 |
| | 5 | 1 | 0.7 | 0.28 | 40 | 12.1 | 11b |

TABLE 3

Polypropylene + coupling agent + glass (Vetrotex 5137)

| Coupling agent | Amount % | Breaking strength MPa | Elongation at break % | Bending modulus MPa | Izod strength J/m | HDT °C. | Glass content |
|---|---|---|---|---|---|---|---|
| — | — | 71 | 2.4 | 5260 | 55 | 140 | 30.3 |
| Example 3 | 14 | 89 | 4.1 | 5030 | 94 | 144 | 29.2 |
| Example 4 | 7 | 86 | 3.1 | 5480 | 71 | 143 | 30.8 |
| Example 8a | 2.5 | 88 | 3.0 | 5800 | 68 | 145 | 32.2 |
| Example 8b | 6 | 90 | 3.2 | 5680 | 76 | 145 | 32.4 |
| Example 9 | 2 | 82 | 3.0 | 5120 | 64 | 142 | 29.5 |
| Example 12a | 2 | 96 | 3.5 | 5290 | 92 | 148 | 29.6 |
| Exxellor PA 2011 | 2 | 93 | 3.3 | 5010 | 82 | 146 | 30.4 |

TABLE 3-continued

| | Polypropylene + coupling agent + glass (Vetrotex 5137) | | | | | | |
|---|---|---|---|---|---|---|---|
| Coupling agent | Amount % | Breaking strength MPa | Elongation at break % | Bending modulus MPa | Izod strength J/m | HDT °C. | Glass content |
| (Exxon) | | | | | | | |

We claim:

1. A process for modifying an olefin polymer to form a coupling agent by grafting it with an unsaturated acid or acid derivative in the presence of a free-radical initiator, characterized in that it comprises stages at which:
   a) the olefin polymer, the unsaturated acid or acid derivative and a first free-radical initiator are externally mixed at a temperature below the melting point of the olefin polymer, but at which the first free radical initiator substantially breaks down into free radicals, and
   b) the reaction mixture obtained from stage a) is internally mixed together with a second free-radical initiator to a temperature, at which the olefin polymer is in a substantially molten state, and at which the second free-radical initiator substantially breaks down into free radicals.

2. A process according to claim 1, characterized in that the first free-radical initiator is broken down at a lower temperature than is the second free-radical initiator.

3. A process according to claim 2, characterized in that the half-life of the first free-radical initiator is less than 1 minute at 130° C. and the half-life of the second free-radical initiator is over 1 minute at 130° C.

4. A process according to claim 1, 2 or 3, characterized in that the second free-radical initiator is present at both stage a) and stage b).

5. A process according to claim 1, 2 or 3, characterized in that the olefin polymer is a homopolymer or copolymer of propylene or a mixture of these and another olefin polymer.

6. A process according to claim 1, 2 or 3, characterized in that the unsaturated acid is itaconic acid, fumaric acid, maleic acid (anhydride), acrylic acid, or any mixture of the same.

7. A process according to any of claim 1, characterized in that the unsaturated acid derivative is an ester.

8. A process according to claim 1, 2 or 3, characterized in that the first free-radical initiator is a peroxide, the 10-hour half-life temperature of which is below 100° C.

9. A process according to claim 8, characterized in that the first free-radical initiator is dilaurolyperoxide.

10. A process according to claim 8, characterized in that the first free-radical initiator is dibenzolyperoxide.

11. A process according to claim 1, 2 or 3, characterized in that the second free-radical initiator is a peroxide, the 10-hour half-life temperature of which is above 100° C.

12. A process according to claim 8, characterized in that the second free-radical initiator is 1,3-bis(t-butylperoxideisopropyl)benzene or 2,5-dimethyl-2,5-bis(t-butylperoxy)hexene.

13. A process according to claim 1 characterized in that the external mixing stage a) is carried out using a rotating mixer, preferably a Papenmeier mixer.

14. A process according to claim 1 characterized in that the external mixing stage b) is carried out using a Banbury mixer, a Werner-Pfleiderer mixer or, preferably, a double-screw extruder 15. The process of claim 5 wherein said another olefin polymer is polybutylene.

16. The process of claim 7 wherein said ester is hydorxyethylmetacrylate.

17. The process of claim 8 wherein said initiator is an organic peroxide.

18. The process of claim 11 wherein said initiator is an organic peroxide.

* * * * *